(12) United States Patent
Kimura et al.

(10) Patent No.: US 8,111,332 B2
(45) Date of Patent: Feb. 7, 2012

(54) NOISE SUPPRESSION METHOD, NOISE SUPPRESSION METHOD PROGRAM, RECORDING MEDIUM RECORDING NOISE SUPPRESSION METHOD PROGRAM, AND NOISE SUPPRESSION APPARATUS

(75) Inventors: Seiji Kimura, Chiba (JP); Masami Ogata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1273 days.

(21) Appl. No.: 11/758,749

(22) Filed: Jun. 6, 2007

(65) Prior Publication Data

US 2007/0293181 A1    Dec. 20, 2007

(30) Foreign Application Priority Data

Jun. 6, 2006    (JP) .................................. 2006-156803

(51) Int. Cl.
*H04N 5/00*    (2011.01)
(52) U.S. Cl. ........................................ 348/622; 348/620
(58) Field of Classification Search ............ 348/607–623
See application file for complete search history.

(56) References Cited

U.S. PATENT DOCUMENTS

| | | | |
|---|---|---|---|
| 4,841,366 A * | 6/1989 | Katagiri et al. ................ | 348/620 |
| 5,508,751 A | 4/1996 | Nitta | |
| 6,094,233 A | 7/2000 | Miki et al. | |
| 7,194,135 B2 * | 3/2007 | Satou et al. .................... | 382/236 |
| 2006/0114994 A1 | 6/2006 | Silverstein | |
| 2007/0229709 A1 * | 10/2007 | Asamura et al. .............. | 348/607 |

FOREIGN PATENT DOCUMENTS

| | | |
|---|---|---|
| JP | 61-177073 | 8/1986 |
| JP | 62-290270 | 12/1987 |
| JP | 05-336497 | 12/1993 |
| JP | 08-172551 | 7/1996 |
| JP | 2000-224444 | 8/2000 |
| JP | 2001-136416 | 5/2001 |

OTHER PUBLICATIONS

European Search Report dated Nov. 27, 2009, issued in corresponding European Patent Application No. 07-25-2267.
James C. Brailean et al., "Noise Reduction Filters for Dynamic Image Sequences: A Review," Proceedings of the IEEE, vol. 83, No. 9 pp. 1272-1291 (Sep. 1995).
Office Action issued on May 24, 2011 in corresponding Japanese Patent Application No. JP 2006-156803; (3 pages).

* cited by examiner

*Primary Examiner* — Michael Lee
(74) *Attorney, Agent, or Firm* — Finnegan, Henderson, Farabow, Garrett & Dunner, L.L.P.

(57) ABSTRACT

An apparatus for suppressing noise of a video signal. The apparatus includes: a difference-signal generation section generating a difference signal being a field or frame difference between the input and the output video signals; a noise compensation-signal generation section generating a noise compensation signal; a noise-compensation signal subtraction section; and a feedback-ratio control section, wherein the feedback-ratio control section includes a signal-level determination section determining a signal level of the difference signal for each area and detecting an abrupt change in an input signal, a count section counting the number of input fields or frames from the time of an abrupt change in a signal level to the subsequent abrupt change, and a feedback-ratio setting section setting a feedback ratio for the area in accordance with a count value, wherein the feedback-ratio setting section sets the feedback ratio such that the ratio gradually increases as the count value increases.

7 Claims, 18 Drawing Sheets

FIG. 6

| t | kh |
|---|---|
| 0 | 0 |
| 1 | 1/2 |
| 2 | 2/3 |
| 3 | 3/4 |
| 4 | 4/5 |
| 5 | 5/6 |
| 6 | 6/7 |
| ⋮ | ⋮ |
| n | n/n+1 |

NOISE SUPPRESSION METHOD, NOISE SUPPRESSION METHOD PROGRAM, RECORDING MEDIUM RECORDING NOISE SUPPRESSION METHOD PROGRAM, AND NOISE SUPPRESSION APPARATUS

CROSS REFERENCES TO RELATED APPLICATIONS

The present invention contains subject matter related to Japanese Patent Application JP 2006-156803 filed in the Japanese Patent Office on Jun. 6, 2006, the entire contents of which are incorporated herein by reference.

BACKGROUND OF THE INVENTION

1. Field of the Invention

The present invention relates to a noise suppression method, a noise suppression method program, a recording medium recording a noise suppression method program, and a noise suppression apparatus. More particularly, the present invention can be applied to a time-cyclic noise filter eliminating noise of a video signal. The present invention makes it possible to suppress noise more sufficiently and at a higher speed than in the past by counting the number of fields or the number of frames after a sudden change in the signal level of an input video signal, and dynamically controlling the feedback ratio to increase gradually in accordance with the count value.

2. Description of the Related Art

To date, as shown in FIG. 13, a time-cyclic noise filter has been used to suppress noise of a video signal using a field difference of a frame difference. That is to say, in this noise filter 1, a delay-signal generation section 2 delays an output video signal S2 for a period of one field or one frame, and outputs a reference video signal S3 for extracting noise components. In this regard, the reference video signal S3 may be generated by performing motion compensation on the output video signal S2 here. A subtraction circuit 3 subtracts the reference video signal S3 from the input video signal S1 to generate a difference signal S4. A compensation-signal generation section 4 multiples the difference signal S4 by a feedback ratio k to generate a noise compensation signal S5. In this regard, at this time, the noise compensation signal S5 is sometimes generated such that, for example, the smaller the amplitude of a change is, the more likely that the change is noise, and the feedback ratio is set to a high value, on the contrary, the larger the amplitude of a change is, the more likely that the change is not noise, and the feedback ratio is set to a low value. Also, the difference signal S4 is sometimes bank-divided and processed. A subtraction circuit 5 subtracts the noise compensation signal S5 from the input video signal S1 to generate the output video signal S2.

On such a time-cyclic noise filter, a scheme for measuring a noise level and automatically setting the signal level of the noise compensation signal S5 on the basis of the noise-level measuring result has been proposed in Japanese Unexamined Patent Application Publication No. 2001-136416, etc.

The noise reduction processing in such a time-cyclic noise filter can be expressed by the following recurrence relation. In this regard, here, $I_t$ is the signal level of the input video signal S1, and $O_t$ is the signal level of the output video signal S2. Also, the subscript t of each symbol is time. When the processing unit of the input video signal S1 is a frame, or a field, the subscript t is the number of the frame, or the field from the start, respectively. Accordingly, in the configuration in which the output video signal S2 is simply delayed and fed back, $O_{t-1}$ is the signal level of the reference video signal S3, and $(I_t - O_{t-1})$ is the signal level of the difference signal S4. In this regard, here, it is assumed that the average signal level of the input video signal S1 is 0 level, and this input video signal S1 includes only a noise component having variance $\sigma_0^2$.

[Expression 1]

$$O_t = I_t - k \cdot (I_t - O_{t-1}) \qquad (1)$$
$$= (1 - k) \cdot I_t + k \cdot O_{t-1}$$

The signal level of noise average 0 level. There is no correlation between successive fields or frames. Thus, the variance $\sigma_0^2$ of the reference video signal S3 at time t can be expressed by the following expression on the basis of Expression (1).

[Expression 2]

$$\sigma_0^2 = (1-k)^2 \cdot \sigma_0^2 + k\sigma_{t-1}^2 \qquad (2)$$

By solving the recurrence relation of Expression (2), the variance of the output video signal S2 at time t can be expressed by the following general expression.

[Expression 3]

$$\sigma_t^2 = \frac{(2 \cdot k^{2t+1} + 1 - k)}{(1 + k)} \cdot \sigma_0^2 \qquad (3)$$

Here, since the feedback ratio k is less than 1 (k<1), when time t is infinity, the variance$^2$ of the output video signal S2 can be expressed by the following expression.

[Expression 4]

$$\sigma_\infty^2 = \frac{(1-k)}{(1+k)} \cdot \sigma_0^2 \qquad (4)$$

Here, $\sigma_t^2/\sigma_0^2$ represents the noise reduction rate at time t. Accordingly, the noise reduction rate at infinite time by the feedback ratio k is shown by FIG. 14. Thus, from Expression (4) in FIG. 14, it is understood that in a known time-cyclic noise filter, the noise reduction effect becomes higher as the feedback ratio k is set higher.

From the above relational expression, the relationship between the variance $\sigma_t^2$ of the output video signal S2 and time t is shown in FIG. 15. Accordingly, it is understood that, in the known time-cyclic noise filter, if the feedback ratio k is set high, it takes time to converge.

Thus, in the known time-cyclic noise filter, there has been a problem in that if the setting is determined so as to increase the noise reduction effect, it is difficult to ensure the noise reduction effect of a portion in fast motion. That is to say, for example as shown in FIG. 16, if moving objects 7A and 7B are moving in front of a still background at a high speed, when viewing a part of the background, indicated by the arrow A, over which the moving objects 7A and 7B are crossing, the background appears and the moving objects 7A and 7B appears in this part at points t1, t2, and t3 in time as shown in FIGS. 17 and 18. In this case, if the feedback ratio k is set to a low value, noise can be reduced sufficiently at a high speed in response to the moving speed of the moving objects 7A and 7B as shown in FIG. 17, whereas the noise reduction effect becomes little. Also, in this case, in the part of the background over which the moving objects 7A and 7B are not crossing, it becomes difficult to sufficiently ensure the noise reduction effect because the feedback ratio k is low.

On the contrary, if the feedback ratio k is set to a high value, in the part of the background over which the moving objects 7A and 7B are not crossing, it is possible to ensure the noise reduction effect sufficiently. However, in the part of the background over which the moving objects 7A and 7B are crossing, it becomes difficult to suppress noise sufficiently at a high speed in response to the moving speed of the moving objects 7A and 7B as shown in FIG. 18.

SUMMARY OF THE INVENTION

The present invention has been made in view of the above points. It is desirable to propose a noise suppression method, a noise suppression method program, a recording medium recording a noise suppression method program, and a noise suppression apparatus which are capable of suppress noise more sufficiently and at a higher speed than in the past.

According to an embodiment of the present invention, there is provided a method of suppressing noise of an input video signal and outputting an output video signal, the method of suppressing noise, including the steps of: generating a difference signal being a field difference or a frame difference between the input video signal and the output video signal; generating a noise compensation signal by multiplying the difference signal by a feedback ratio; subtracting the noise compensation signal from the input video signal; and controlling a feedback ratio, wherein the step of controlling the feedback ratio includes the steps of determining a signal level of the difference signal by a criterion value for each area set for the difference signal, and detecting an abrupt change in a signal level of the input video signal, counting the number of fields or the number of frames of the input video signal from the time when the signal-level determination section detects the abrupt change in the signal level to the time when the signal-level determination section subsequently detects the abrupt change in the signal level, and setting a feedback ratio for each of the areas in accordance with a count value by the step of counting, wherein the step of setting a feedback ratio sets the feedback ratio such that the feedback ratio gradually increases from 0 as the count value increases.

According to another embodiment of the present invention, there is provided a program of a method of suppressing noise of an input video signal and outputting an output video signal, the program including the steps of: generating a difference signal being a field difference or a frame difference between the input video signal and the output video signal; generating a noise compensation signal by multiplying the difference signal by a feedback ratio; subtracting the noise compensation signal from the input video signal; and controlling a feedback ratio, wherein the step of controlling the feedback ratio includes the steps of determining a signal level of the difference signal by a criterion value for each area set for the difference signal, and detecting an abrupt change in a signal level of the input video signal, counting the number of fields or the number of frames of the input video signal from the time when the signal-level determination section detects the abrupt change in the signal level to the time when the signal-level determination section subsequently detects the abrupt change in the signal level, and setting a feedback ratio for each of the areas in accordance with a count value by the step of counting, wherein the step of setting a feedback ratio sets the feedback ratio such that the feedback ratio gradually increases from 0 as the count value increases.

According to another embodiment of the present invention, there is provided A recording medium for recording a program of a method of suppressing noise of an input video signal and outputting an output video signal, the program including the steps of: generating a difference signal being a field difference or a frame difference between the input video signal and the output video signal; generating a noise compensation signal by multiplying the difference signal by a feedback ratio; subtracting the noise compensation signal from the input video signal; and controlling a feedback ratio, wherein the step of controlling the feedback ratio includes the steps of determining a signal level of the difference signal by a criterion value for each area set for the difference signal, and detecting an abrupt change in a signal level of the input video signal, counting the number of fields or the number of frames of the input video signal from the time when the signal-level determination section detects the abrupt change in the signal level to the time when the signal-level determination section subsequently detects the abrupt change in the signal level, and setting a feedback ratio for each of the areas in accordance with a count value by the step of counting, wherein the step of setting a feedback ratio sets the feedback ratio such that the feedback ratio gradually increases from 0 as the count value increases.

According to another embodiment of the present invention, there is provided a noise suppressing apparatus for suppressing noise of an input video signal and outputting an output video signal, the noise suppressing apparatus including; a difference-signal generation section generating a difference signal being a field difference or a frame difference between the input video signal and the output video signal; a noise compensation-signal and the section generating a noise compensation signal by multiplying the difference signal by a feedback ratio; a noise-compensation signal subtraction section subtracting the noise compensation signal from the input video signal; and a feedback-ratio control section controlling the feedback ratio, wherein the feedback ratio control section includes a signal-level determination section determining a signal level of the difference signal by a criterion value for each area set for the difference signal, and detecting an abrupt change in a signal level of the input video signal, a count section counting the number of fields or the number of frames of the input video signal from the time when the signal-level determination section detects the abrupt change in the signal level to the time when the signal-level determination section subsequently detects the abrupt change in the signal level, and a feedback-ratio setting section setting the feedback ratio for each of the areas in accordance with a count value of the count section, wherein the feedback-ratio setting section sets the feedback ratio such that the feedback ratio gradually increases from 0 as the count value increases.

By the configuration of the above embodiments, the feedback ratio is dynamically changed in the field or the frame after the detection of an abrupt change in the signal level of the input video signal, and the feedback ratio is gradually increased. Thus, it is possible to have a great noise reduction effect when the feedback ratio is high, and at the same time, it is possible to shorten the necessary time for the convergence when the feedback ratio is low. Accordingly, it is possible to suppress noise more sufficiently and at a high speed than in the past.

By the present invention, it is possible to suppress noise more sufficiently and at a higher speed than in the past.

BRIEF DESCRIPTION OF THE DRAWINGS

FIG. 6 is a plan view illustrating a feedback-ratio setting section in the noise filter of FIG. 1;

DESCRIPTION OF THE PREFERRED EMBODIMENTS

In the following, a detailed description will be given of embodiments of the present invention with reference to the drawings.

First Embodiment

1. Configuration of Embodiment

Figure 1:
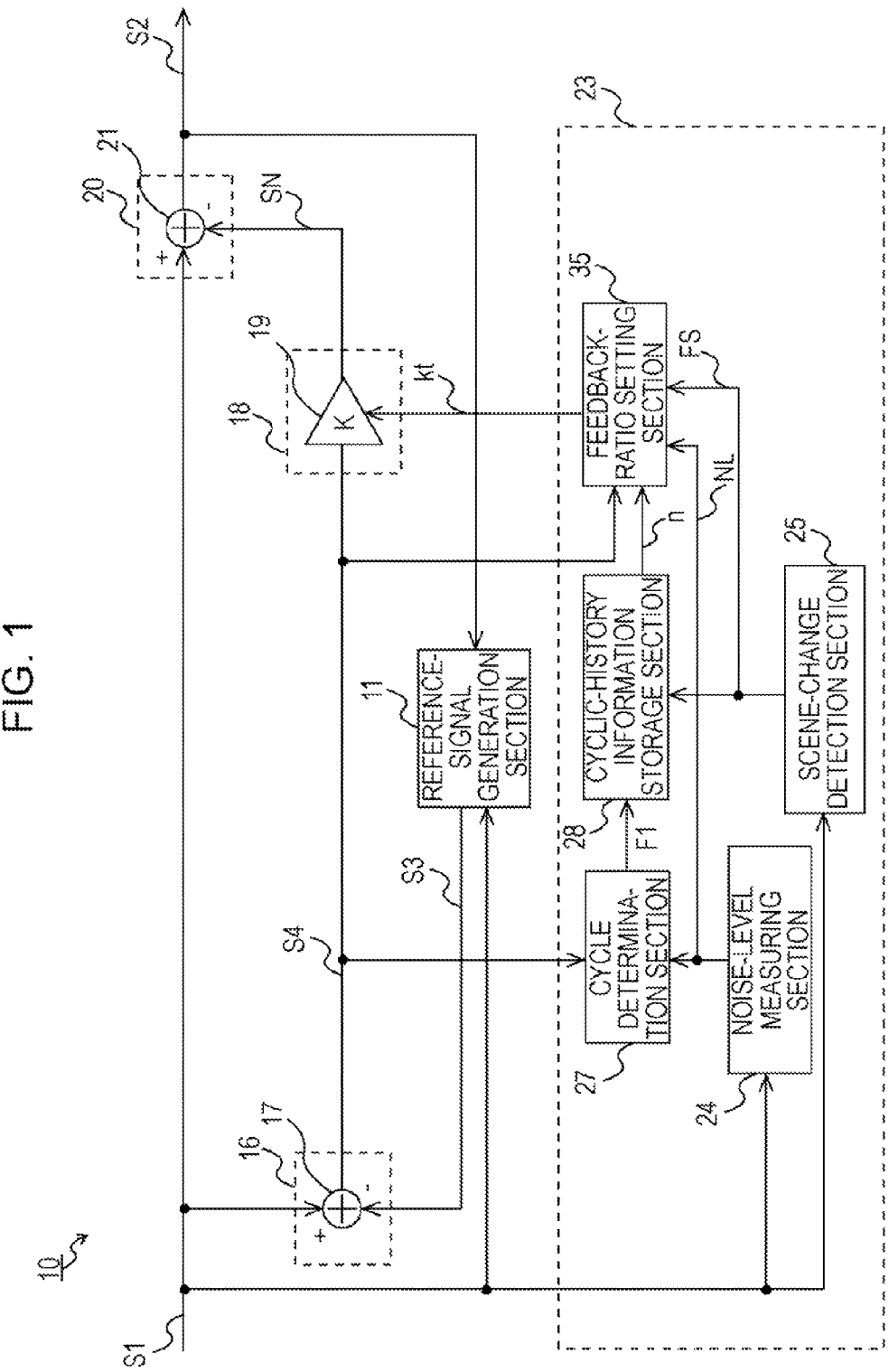
FIG. 1 is a block diagram illustrating a noise filter according to a first embodiment of the present invention.

FIG. 1 is a block diagram illustrating a noise filter according to a first embodiment of the present invention. This noise filter 10 is a time-cyclic noise filter, and suppresses noise of an input video signal S1 using the difference between fields or the difference between frames to output an output video signal S2.

In this noise filter 10, a reference-video-signal generation section 11 delays the output video signal S2 for a period of one field or one frame, and outputs a reference video signal S11. More specifically, the reference-video-signal generation section 11 performs motion compensation on the output video signal S2 to generate the reference video signal S11.

Figure 2:
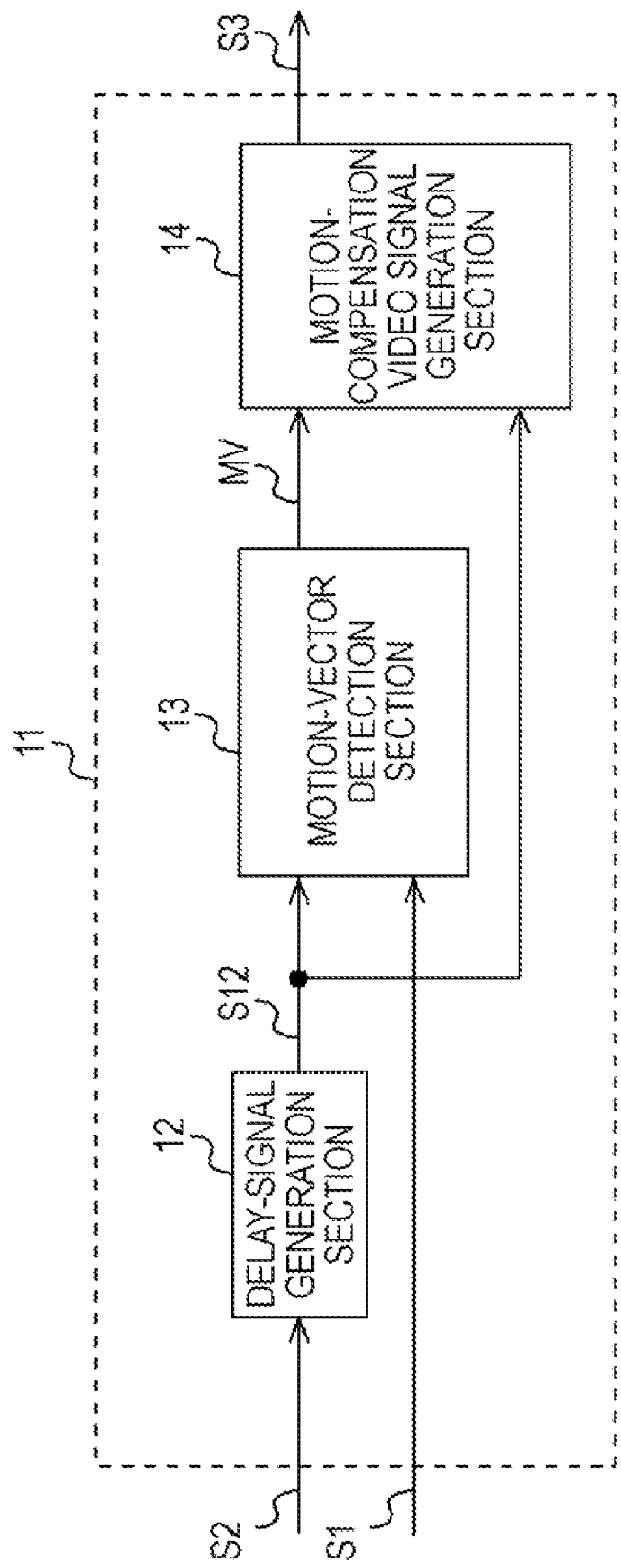
FIG. 2 is a block diagram illustrating the configuration of a reference-video-signal generation section in the noise filter of FIG. 1.

That is to say, as shown in FIG. 2, in the reference-video-signal generation section 11, a delay-signal generation section 12 delays an output video signal S2 for a period of one field or one frame to generate a delay video signal S12. A motion-vector detection section 13 detects a motion vector MV from the input video signal S1 on the basis of the delay video signal S12. In this regard, various vector detection methods, such as a block matching method, a gradient method, etc., can be applied to the detection of the motion vector here. Also, the accuracy of the motion vector may be either integer-pixel accuracy or factional-pixel accuracy.

Figure 3:
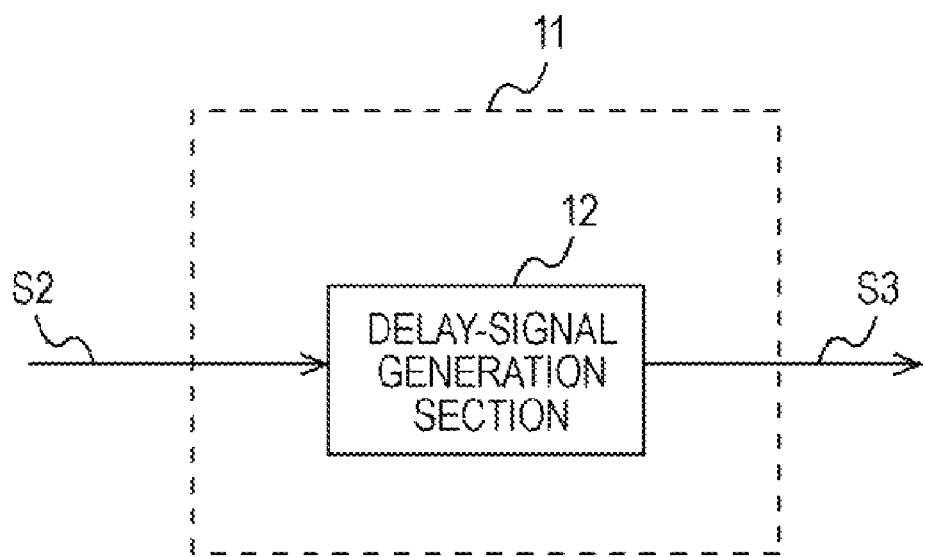
FIG. 3 is a block diagram illustrating the configuration of another example of the reference-video-signal generation section in FIG. 1.

A motion-compensation video signal generation section 14 performs motion compensation on the delay video signal S12 using the motion vector MV, and outputs a reference video signal S3. In this regard, as shown in FIG. 3, if a sufficient characteristic can be ensured practically, the reference video signal S3 here may be generated by simply delaying the output video signal S2 for one field or one frame by the delay-signal generation section 12.

A difference-signal generation section 16 is a subtraction circuit 17, and subtracts the reference video signal S3 from the input video signal S1, and outputs a difference signal S4, which is a field difference or a frame difference between the input video signal S1 and the output video signal S2.

In a compensation-signal generation section 18, an amplifier circuit 19 multiplies the difference signal S4 by the feedback ratio k to generate a noise compensation signal SN.

In a noise-subtraction processing section 20, a subtraction circuit 21 subtracts the noise compensation signal SN from the input video signal S1 in order to suppress noise of the input video signal S1, and outputs the output video signal S2.

In this noise filter 10, a feedback-ratio control section 23 controls the feedback ratio k, and suppresses noise of the input video signal S1 more sufficiently and at a higher speed than in the past by controlling the feedback ratio k.

Here, in the feedback-ratio control section 23, a noise-level measuring section 24 measures the noise level of the input video signal S1 for each pixel of the input video signal S1, and outputs a noise-level measuring result NL. In this regard, the measurement of the noise level here can be carried out, for example, by extracting high frequency components in a certain range with a pixel to be measured as center in the horizontal direction and in the vertical direction using a two-dimensional high-pass filter, and detecting the signal level, etc. Also, the noise level of the input video signal S1 may be detected using the difference signal S4 in place of the input video signal S1.

A scene-change detection section 25 detects a scene change of the input video signal S1, and outputs a scene-change detection flag FS. In this regard, various scene-change detection methods, such as a determination of the sum of the absolute value of a frame difference by a predetermined threshold value, for example, can be widely applied to the scene change detection. Also, a scene change of the input video signal S1 may be detected using the difference signal S4 in place of the input video signal S1.

A cycle determination section 27 detects an abrupt change in the signal level of the input video signal S1 on the basis of the noise level NL detected by the noise-level measuring section 24 for each pixel. That is to say, the cycle determination section 27 multiplies the noise level NL detected by the noise-level measuring section 24 by a predetermined constant α for each pixel, and generates a criterion value Cth (NL·α) of the input video signal S1. Furthermore, the cycle determination section 27 determines the amplitude value |Diff (x, y)| of the difference signal S4 by the criterion value Cth, and detects a portion where the signal level of the input video signal S1 changes abruptly on the basis of the noise level NL. Here, it is unlikely that the portion where the signal level changes abruptly is noise, and that portion is likely to be a change in the original input video signal S1. More specifically, it is just like the case in which a background is hidden by the moving objects described in FIG. 16 and the hidden background appears.

Thus, if the amplitude value |Diff (x, y)| is less than the criterion value Cth, the cycle determination section 27 sets a cycle identification flag F1 indicating the suppression of this signal component. In this regard, the criterion value Cth may be adjustable by the user by allowing the user to set the constant α. Also, the criterion value Cth may be adjustable by the user irrelevantly to the noise level NL. Further, if sufficient characteristic can be ensured practically, the criterion value Cth may be a fixed value.

A cyclic-history information storage section 28 counts the number of setting times n of the continuous cycle identification flag F1 for each area set for the input video signal S1. Thereby, the cyclic-history information storage section 28 counts and outputs the number of fields or the number of frames during the time while the signal level of the input video signal S1 abruptly changed and then the signal level abruptly changed succeedingly.

Figure 4:
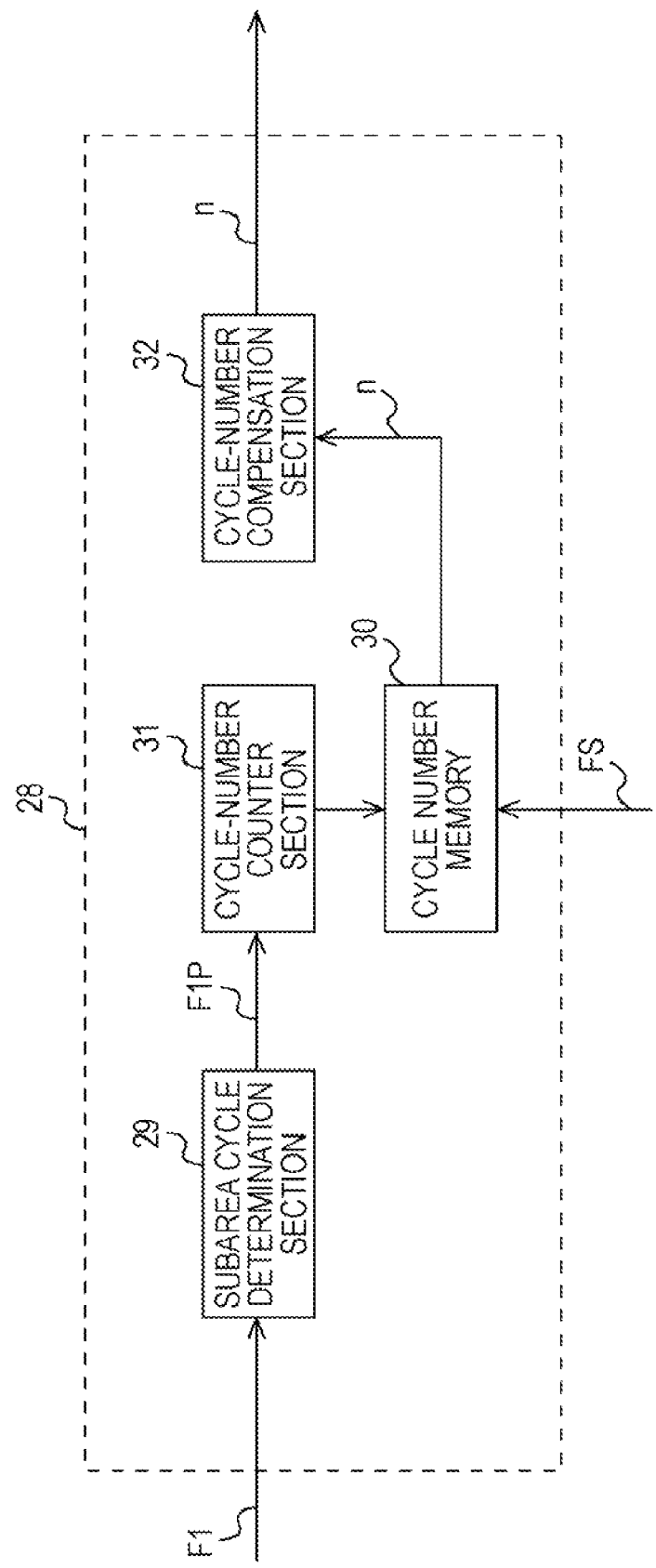
FIG. 4 is a block diagram illustrating the configuration of a cyclic-history information storage section in the noise filter of FIG. 1.
Figure 5:
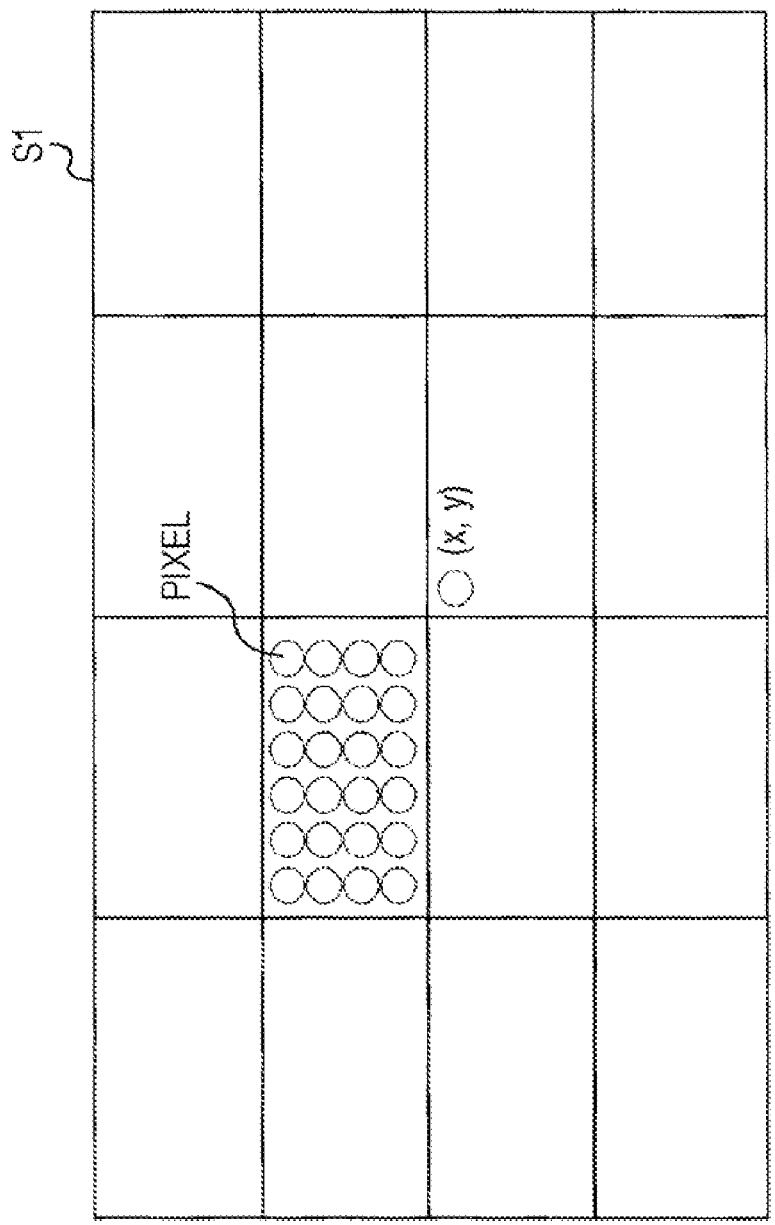
FIG. 5 is a plan view illustrating the cyclic-history information storage section of FIG. 4.

That is to say, as shown in FIG. 4, in the cyclic-history information storage section 28, a subarea cycle determination section 29 determines the setting of the cycle identification flag F1 for each area set for the input video signal S1. Here, as shown in FIG. 5, in this embodiment, one screen of the input video signal S1 is divided into a predetermined number of pixels in the horizontal direction and in the vertical direction to set a plurality of areas. The subarea cycle determination section 29 sums up the number of setting times of the cycle identification flag F1 for each area. Also, the subarea cycle determination section 29 determines the sum result by each predetermined threshold value. The subarea cycle determination section 29 sets an area cycle identification flag F1P of an area whose number of setting times of the cycle identification flag F1 is greater than this threshold value. In this regard, in the example in FIG. 5, one are is set to have 6 pixels and 4 pixels in the horizontal direction and in the vertical direction, respectively. However, the setting of the area is not limited to this, and various settings are possible. Also, the area may vary in size at each portion of one screen. The subarea cycle determination section 29 detects, for example in FIG. 16, the background area hidden by the moving objects 7A and 7B, and further, the background area that appears by the movement of the moving objects 7A and 7B by the determination of the number of setting times of the cycle identification flag F1 by the threshold value.

A cycle number memory 30 records and holds the number of setting times of consecutive area cycle identification flags F1P for each area of the input video signal S1. A cycle-number counter section 31 updates the number of setting times of the corresponding area held in the cycle number memory 30 in accordance with the area cycle identification flag F1P output from the subarea cycle determination section 29. That is to say, the cycle-number counter section 31 initializes, to 0, the number of setting times of the corresponding area held in the cycle number memory 30 for the area in which the area cycle identification flag F1P is not set by the subarea cycle determination section 29. Also, the cycle-number counter section 31 increments the number of setting times of the corresponding area held in the cycle number memory 30 by one when the area cycle identification flag F1P is set by the subarea cycle determination section 29. At this time, if the number of setting times of the corresponding area held in the cycle number memory 30 has increased to a predetermined value, the increment processing is stopped.

When scene-change detection section 25 detects a scene change and sets the scene-change detection flag FS, the cycle number memory 30 initializes the number of setting times for all the held area to 0. Also, the cycle number memory 30 outputs the number of setting times n for each held area at timing corresponding to the processing in the amplifier circuit 19 of the corresponding area of the succeeding field or frame. Accordingly, if the input video signal S1 is an interlaced video signal, one-field period is delayed and output. Also, if the input video signal S1 is a non-interlaced video signal, one-frame period is delayed and output.

A cycle-number compensation section 32 compensates the number of setting times n of each area output from the cycle number memory 30 in accordance with the format of the input video signal S1, and outputs the number. That is to say, when the input video signal S1 is an interlaced video signal and the difference signal S4 is a field difference, or when the input video signal S1 is a non-interlaced video signal and the difference signal S4 is a frame difference, the cycle-number compensation section 32 outputs the number of setting times n for each area output from the cycle number memory 30 without any compensation. On the other hand, when the input video signal S1 is an interlaced video signal and the difference signal S4 is a frame difference, the cycle-number compensation section 32 compensates the number of setting times n for each area output from the cycle number memory 30 into one-half, and outputs the number. In this regard, when the input video signal S1 is an interlaced video signal and the difference signal S4 is a frame difference, the difference signals S4 can be obtained for even fields and for odd fields, respectively. Accordingly, the cyclic-history information storage section 28 may be provided with an even-field processing system and an odd-field processing system in accordance with this, and the number of setting times n detected by each system may be output interchangeably. In this regard, in this case, the cycle-number compensation section 32 may be omitted. Also, the configuration of the cycle-number compensation section 32 may be omitted, and the processing to compensate the number of setting times n may be executed at the same time in the setting of the feedback ratio in a feedback-ratio setting section 35 described below.

The feedback-ratio setting section 35 sets the feedback ratio kt for each pixel in accordance with the number of setting times n output from the cyclic-history information storage section 28. The feedback-ratio setting section 35 calculates a feedback ratio kh, which changes its value in accordance with the number of setting times n, and a feedback ratio kc in accordance with the amplitude of the difference signal S4 for the noise level NL, individually, and then multiplies kh and kc to obtain the final feedback ratio kt.

Here, Expression (2) indicates the variance of the output video signal s2 at time t. In order to obtain the feedback ratio k that minimizes this variance, Expression (2) is first differentiated to obtain the following relational expression.

[Expression 5]

$$(\sigma_t^2)' = -2(1-k) \cdot \sigma_0^2 + 2k\sigma_{t-1}^2 \quad (5)$$

Here, when solving Expression (5) for k, the feedback ratio kh minimizing variance $\sigma_t^2$ at time t can be expressed by the following expression.

[Expression 6]

$$kh = \frac{\sigma_0^2}{\sigma_0^2 + \sigma_{t-1}^2} \quad (6)$$

Figure 6:
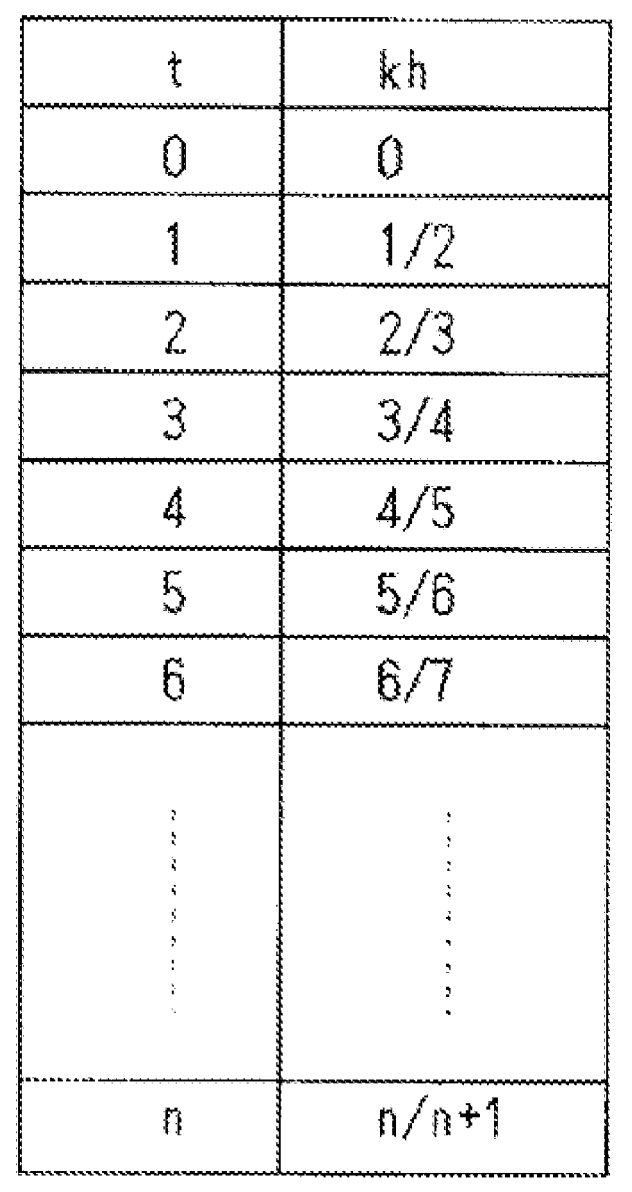
Figure 16A:
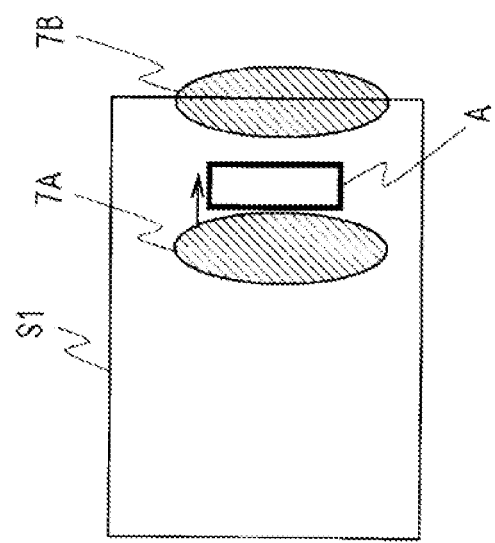
FIG. 16 is a plan view illustrating an example of a video with a fast motion.
Figure 16B:
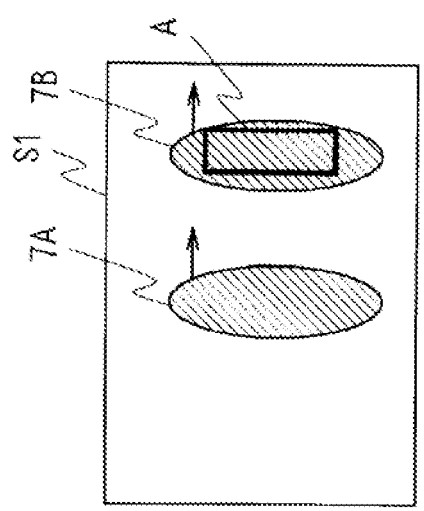
Figure 16C:
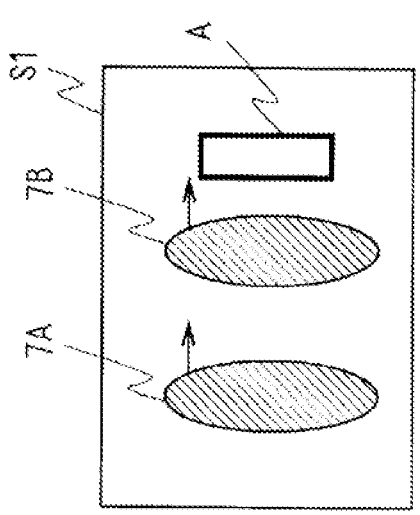
Figure 17:
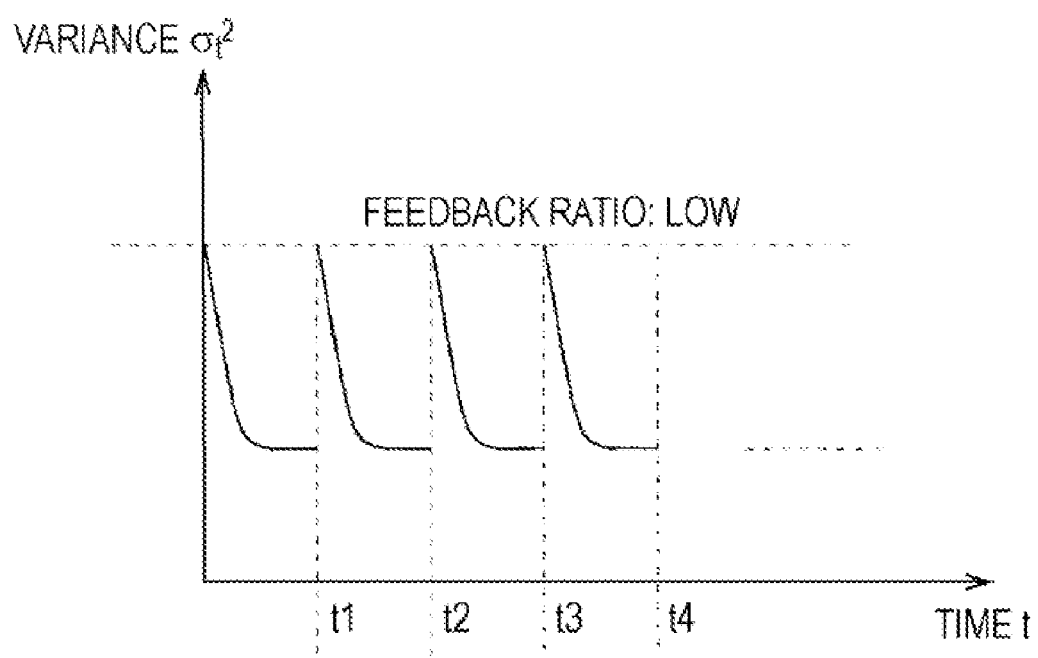
FIG. 17 is a characteristic curve illustrating a characteristic when a feedback ratio is low.
Figure 18:
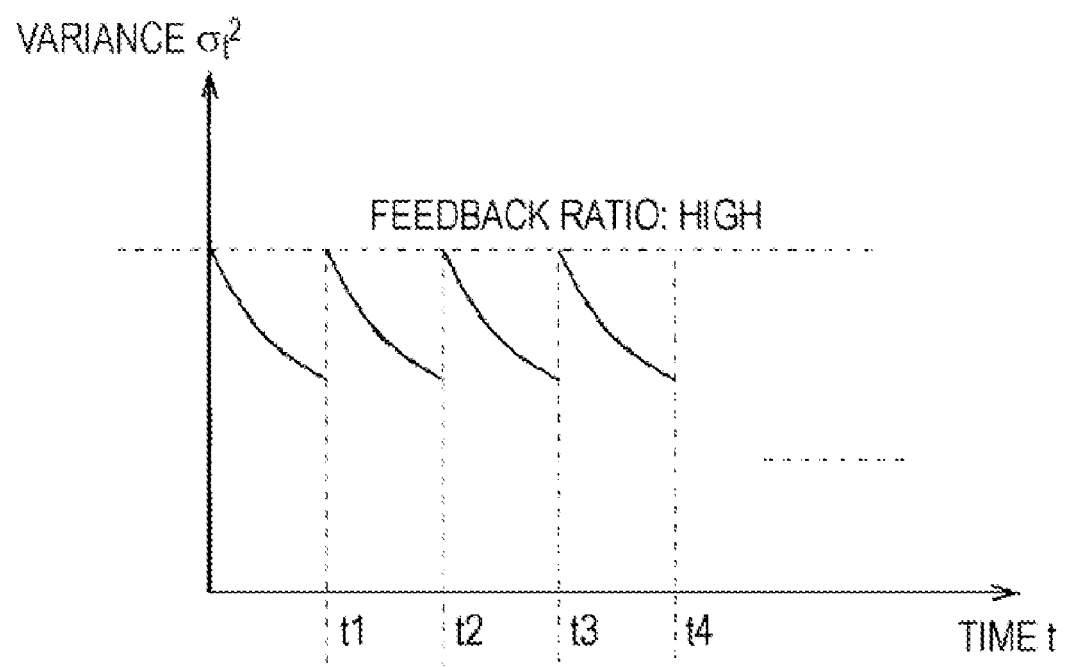
FIG. 18 is a characteristic curve illustrating a characteristic when a feedback ratio is high.

Accordingly, as shown in FIG. 6, the feedback ratio kh minimizing variance $\sigma_t^2$ at each time t can be expressed as n/(n+1) using the number of continuous setting times n. In this regard, n=0 represents the frame or the field immediately after a scene change as described above, or a background area hidden by the moving objects 7A and 7B as shown in FIG. 16, and a background area which appears by the movement of the moving objects 7A and 7B. Thus, in this case, for the noise compensation signal SN by the difference signal S4 of the preceding field or the preceding frame, the feedback ratio kt is set to 0, and is set not to subtract from the input video signal S1. Also, in the subsequent frames and fields, the feedback ratio kh is set such that the value increases in accordance with the value n corresponding to the continuous frame or field in sequence. In this regard, the feedback-ratio setting section 35 obtains the feedback ratio kt by referring to a look-up table by the number of setting times n output from the cyclic-history information storage section 28. In this regard, the feedback ratio kh may be obtained by calculation. Also, the feedback ratio kt may be limited to a value having a finite bit length.

Figure 7:
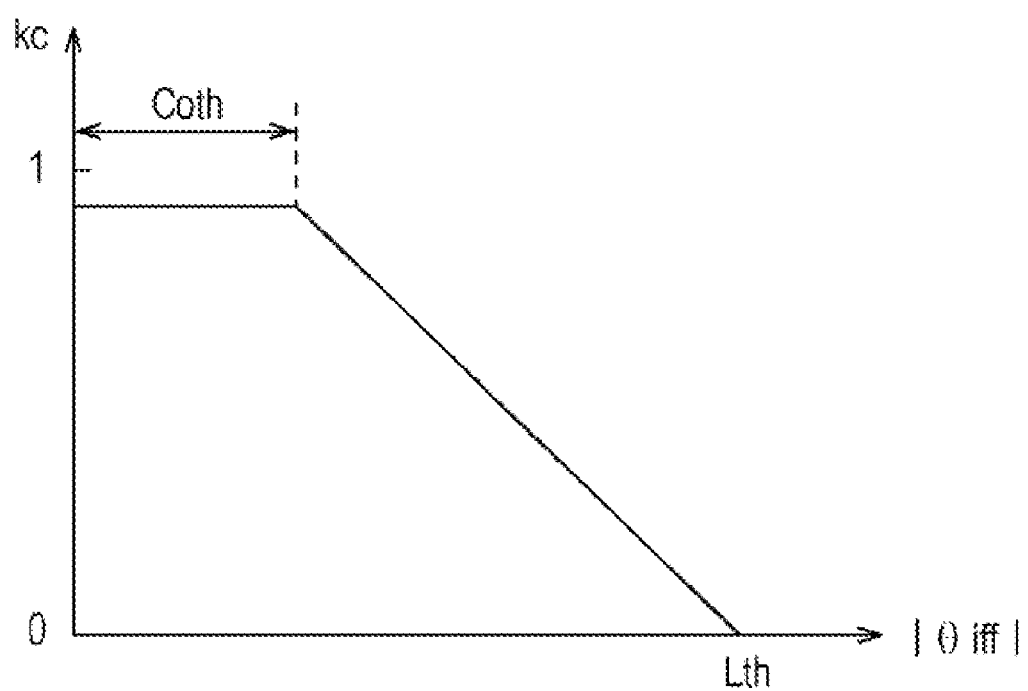
FIG. 7 is plan view illustrating the setting of the feedback ratio of the feedback-ratio setting section in the noise filter of FIG. 1.

Also, the feedback-ratio setting section 35 multiplies the noise level NL by a predetermined constant $\beta$ to generate a first criterion value Lth (NL·$\beta$) of the difference signal S4. Furthermore, the feedback-ratio setting section 35 multiplies the criterion Lth by a constant $\gamma$ less than 1 to generate a second criterion value Coth (Lth·$\gamma$) of the difference signal S4. As shown in FIG. 7, the feedback-ratio setting section 35 determines the amplitude value |Diff (x, y)| of the difference signal S4 by the first and the second criteria Lth (NL·$\beta$) and Coth (Lth·$\gamma$). If the amplitude value |Diff (x, y)| is greater than the first criterion value Lth (NL·$\beta$), the feedback ratio kc is set to 0. Also, if the amplitude value |Diff (x, y)| is less than the second criterion value Coth (Lth·$\gamma$), the feedback ratio kc is set to a fixed value less than 1. Also, if the amplitude value |Diff (x, y)| is between the first criterion value Lth (NL·$\beta$) and the second criterion value Coth (Lth·$\gamma$), the feedback ratio kc is set to a value by linear interpolation corresponding to the amplitude value |Diff (x, y)|. By this means, the feedback-ratio setting section 35 sets the feedback ratio kc such that the value of the feedback ratio kc decreases as the amplitude value of the difference signal for the noise-level measuring result increases. In this regard, the feedback-ratio setting section 35 sets the feedback ratio kc for each pixel.

2. Operation of Embodiment

In the above configuration, the input video signal S1 (FIG. 1) input sequentially is input into the noise filter 10 in sequence. Then, the noise compensation signal SN is subtracted from the signal by the subtraction circuit 21 to be subjected to the noise suppression, and is output as an output video signal S2. The output video signal S2 is processed by the reference-video-signal generation section 11 to generate the reference video signal S3, and the reference video signal S3 is subtracted from the input video signal S1 by the subtraction circuit 17 to generate the difference signal S4. Also, this difference signal S4 is processed by the compensation-signal generation section 18 to generate the noise compensation signal SN. Thus, the input video signal S1 is subjected to noise suppression by the characteristic in accordance with the setting of the feedback ratio kt in the compensation-signal generation section 18 in the time-cyclic noise filter 10.

Figure 8:
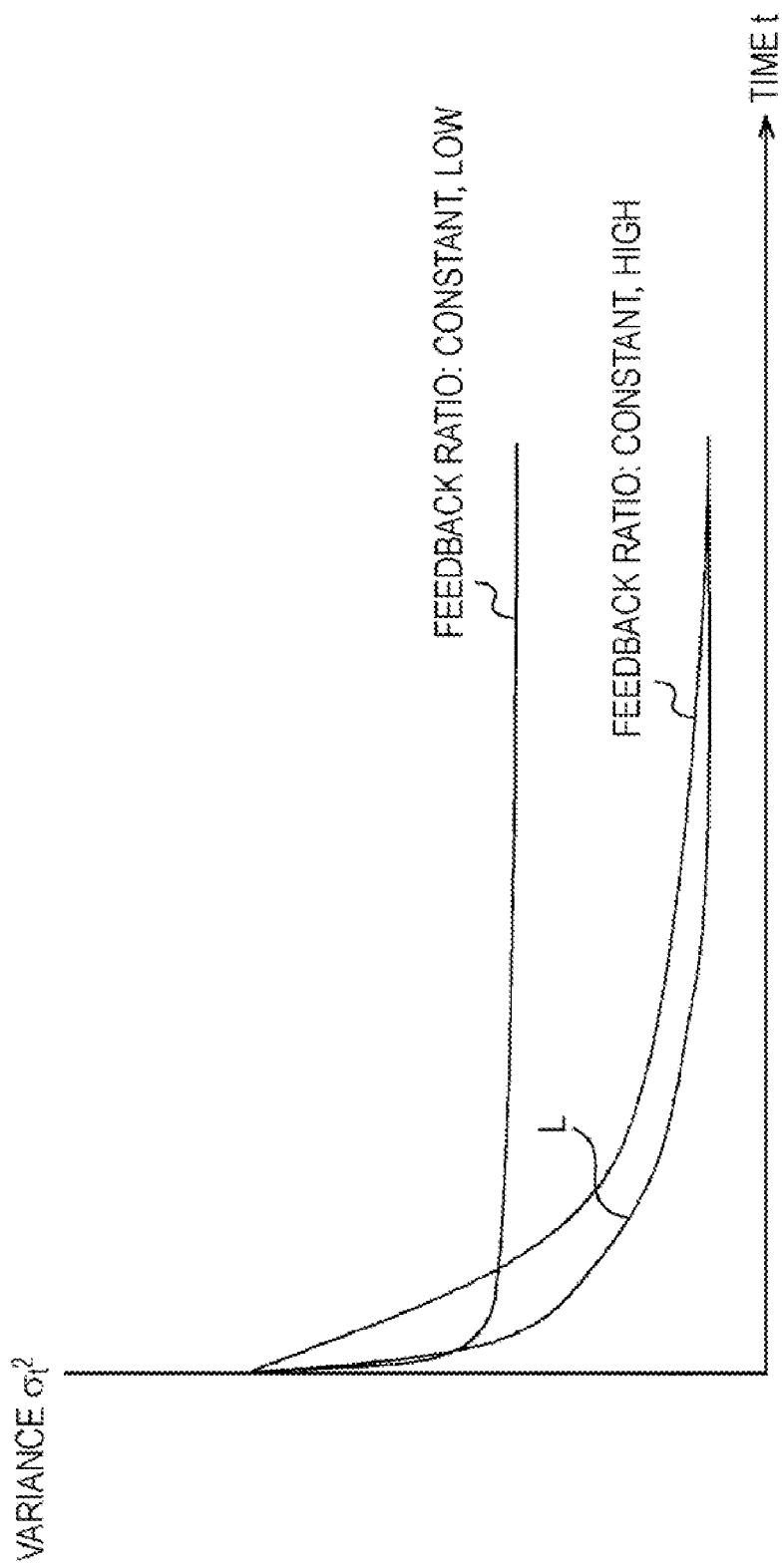
FIG. 8 is a characteristic curve illustrating the characteristic of the noise filter of FIG. 1.

However, as shown in FIG. 8, if the feedback ratio kt is set to a high constant value, the final noise reduction effect becomes great, but it takes long time for the convergence, and it becomes difficult to correspond to a fast motion. On the other hand, if the feedback ratio kt is set to a low constant value, the convergence time becomes short, but the final noise reduction effect becomes little.

Thus, in the noise filter 10, the noise level NL of the input video signal S1 is measured by the noise-level measuring section 24, and the criterion value Cth of the difference signal S4 is set on the basis of the noise level NL. Also, the amplitude value |Diff (x, y)| of the difference signal S4 is determined by the criterion value Cth. If the amplitude value |Diff (x, y)| of the difference signal S4 is less than the criterion value Cth, a cycle identification flag F1 indicating the noise suppression is set as the pixel in which the signal level of the difference signal S4 has been changed by noise.

For the input video signal S1, the cycle identification flag F1 is summed up for each area (FIG. 5) set for one screen of the input video signal S1 by the subarea cycle determination section 29 (FIG. 4), and an area cycle identification flag F1P is set. Also, the consecutive setting of the cycle identification flag F1 is counted for each area by the cycle-number counter section 31, and the feedback ratio kh (FIG. 6) corresponding to the number of the setting times n, the count result, is set by the feedback-ratio setting section 35.

Here, the feedback-ratio setting section 35 sets the feedback ratio to a low value at first, and then sets the value to gradually increase as the number of setting times n increases (FIG. 6). Thus, for the input video signal S1, the variance value decreases by a low feedback ratio at first in the consecutive fields or the frames in order to converge at a high speed (FIG. 8). After that, the setting is determined such that the feedback ratio gradually increases, and the final noise suppression effect becomes high. Accordingly, in this noise filter 10, the dynamic setting of the feedback ratio makes it possible to have a great noise reduction effect when the feedback ratio is high, and at the same time, it is possible to shorten the necessary time for the convergence when the feedback ratio is low. Thus, it is possible to suppress noise more sufficiently and at a higher speed than in the past.

At this time, only if the amplitude value |Diff (x, y)| of the difference signal S4 is less than the criterion value Cth, the cycle identification flag F1 of the input video signal S1 is set, and the feedback ratio value is varied in sequence. If the amplitude value |Diff (x, y)| of the difference signal S4 is greater than the criterion value Cth, the cycle identification flag F1 is not set, and the feedback ratio kt is set to 0. Thus, the setting is determined for the input video signal S1 not to be subjected to the noise suppression in the moving area effectively using the configuration to set the feedback ratio dynamically. Thus, it is possible to prevent the occurrence of a blur, which is so-called a smear of a moving object.

Also, at this time, for the input video signal S1, the criterion value Cth of the amplitude value |Diff (x, y)| of the difference signal S4 is set in accordance with the noise level NL. Thus, it is possible to effectively avoid the situation in which a still-image area is mistakenly determined to be a moving area by the increase of the noise level. As a result, even if the noise level of the input video signal S1 is high, it is possible to sufficiently suppress noise.

Furthermore, if the scene-change detection section 25 detects a scene change, that is to say, a scene change occurs in the input video signal S1, in the same manner as a moving area, the number of setting times n is set in the initial value, and the feedback ratio kh is set to an initial value 0. Accordingly, when a scene change occurs in the input video signal S1, the setting is determined not to perform noise suppression by effectively using the configuration to set the feedback ratio dynamically. Thus, it is possible to prevent the occurrence of a blur in the portion of a scene change.

Also, for the input video signal S1, the feedback-ratio setting section 35 determines the amplitude value |Diff (x, y)| of the difference signal S4 by the first criterion value Lth (NL·β) produced by the multiplication of the noise level NL and a predetermined constant β, and the second criterion value Coth (Lth·γ) produced by the multiplication of the criterion value Lth and a constant γ less than 1. The feedback ratio kc is generated so as to have a higher value as the amplitude value |Diff (x, y)| is lower (FIG. 7). Also, the feedback ratio kh in accordance with the number of setting times n, which is the number of repetition, is multiplied by the feedback ratio kc in order to set the final feedback ratio kt.

By this means, the high amplitude components of the input video signal S1 is suppressed to generate the noise compensation signal SN by effectively using the configuration of dynamically setting the feedback ratio. Thus, the deterioration of the original high frequency components of the input video signal S1, such as an edge, etc., is prevented. Also, at this time, the first and the second criteria Lth (NL·β) and Coth (Lth·γ) are set in accordance with the noise level NL. Thus, the deterioration of the original high frequency components of the input video signal S1 is prevented appropriately in accordance with the amount of noise.

3. Effect of Embodiment

With the above configuration, it is possible to suppress noise more sufficiently and at a higher speed than in the past by counting the number of fields or the number of frames after a sudden change in the signal level of an input video signal, and dynamically controlling the feedback ratio to the increase gradually in accordance with the count value.

Also, at this time, a criterion is set to detect an area in which the signal level has changed abruptly on the basis of the measuring result of the noise level. This makes it possible to effectively avoid the erroneous detection of a still-image portion and a moving image portion by the noise level, and to reliably obtain the noise reduction effect.

Also, the count values of all areas are initialized to 0 by the detection of a scene change. Thus, it is possible to suppress noise more sufficiently and at a higher speed than in the past after a scene change.

Also, a feedback ratio kc is generated so as to have a lower value as the amplitude of the difference signal for the noise-level measuring result becomes high, and the feedback ratio is compensated by multiplying the feedback ratio kc by the feedback ratio kh. Thus, it is possible to suppress noise level by suppressing a high amplitude component using the configuration of dynamically varying and controlling the feedback ratio, and to appropriately suppress the noise level.

Second Embodiment

Figure 9:
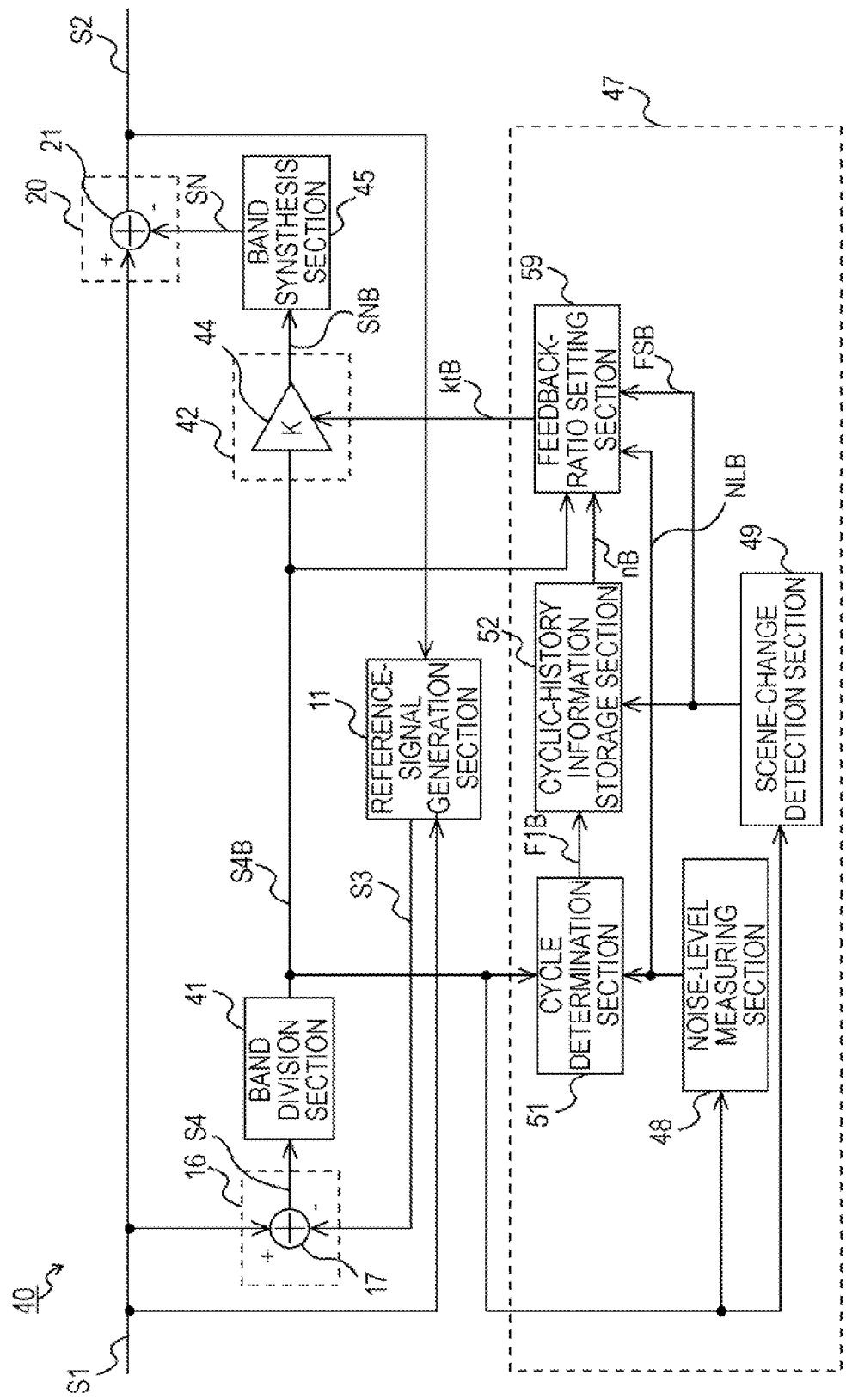
FIG. 9 is a block diagram illustrating the noise filter according to a second embodiment of the present invention.

FIG. 9 is a block diagram illustrating the noise filter according to a second embodiment of the present invention. In this noise filter 40, the same components as those in the noise filter 10 of the first embodiment are marked with the corresponding reference numerals, and the duplicated descriptions will be omitted.

In the noise filter 40, the band division section 41 transforms the difference signal S4, which is a signal in a pixel area, into sub-difference signals S4B having a plurality of bands of the frequency domain, and outputs the signal. Here, various methods, such as an orthogonal transformation processing, for example, Hadamard transformation, Haar transformation, a discrete cosine transformation, etc., a wavelet transformation using a filter bank, sub-band division, etc., can be applied to the transformation processing into the frequency domain.

In a compensation-signal generation section 42, a amplifier circuit 44 multiplies the sub-difference signals S4B having a plurality of bands divided into a plurality of bands by the band division section 41, and the feedback ratios ktB of individual bands, respectively to generate the noise compensation signals SNB for a plurality of bands.

A band synthesis section 45 converts the noise compensation signals SNB for a plurality of bands output from the compensation-signal generation section 42 into a signal of a pixel area, and generates the compensation signal SN. Thus, the noise filter 40 divides the difference signal S4 into bands, sets the feedback ratio ktB for each band, and suppresses the noise level of the input video signal S1.

In accordance with this configuration, the feedback-ratio control section 47 sets the feedback ratio ktB for each band. Thus, in the feedback-ratio control section 47, a noise-level measuring section 48 and a scene-change detection section 49 process sub-difference signals S4B divided into bands individually, and set a noise level NLB and a scene-change detection flag FSB for each band.

Figure 10:
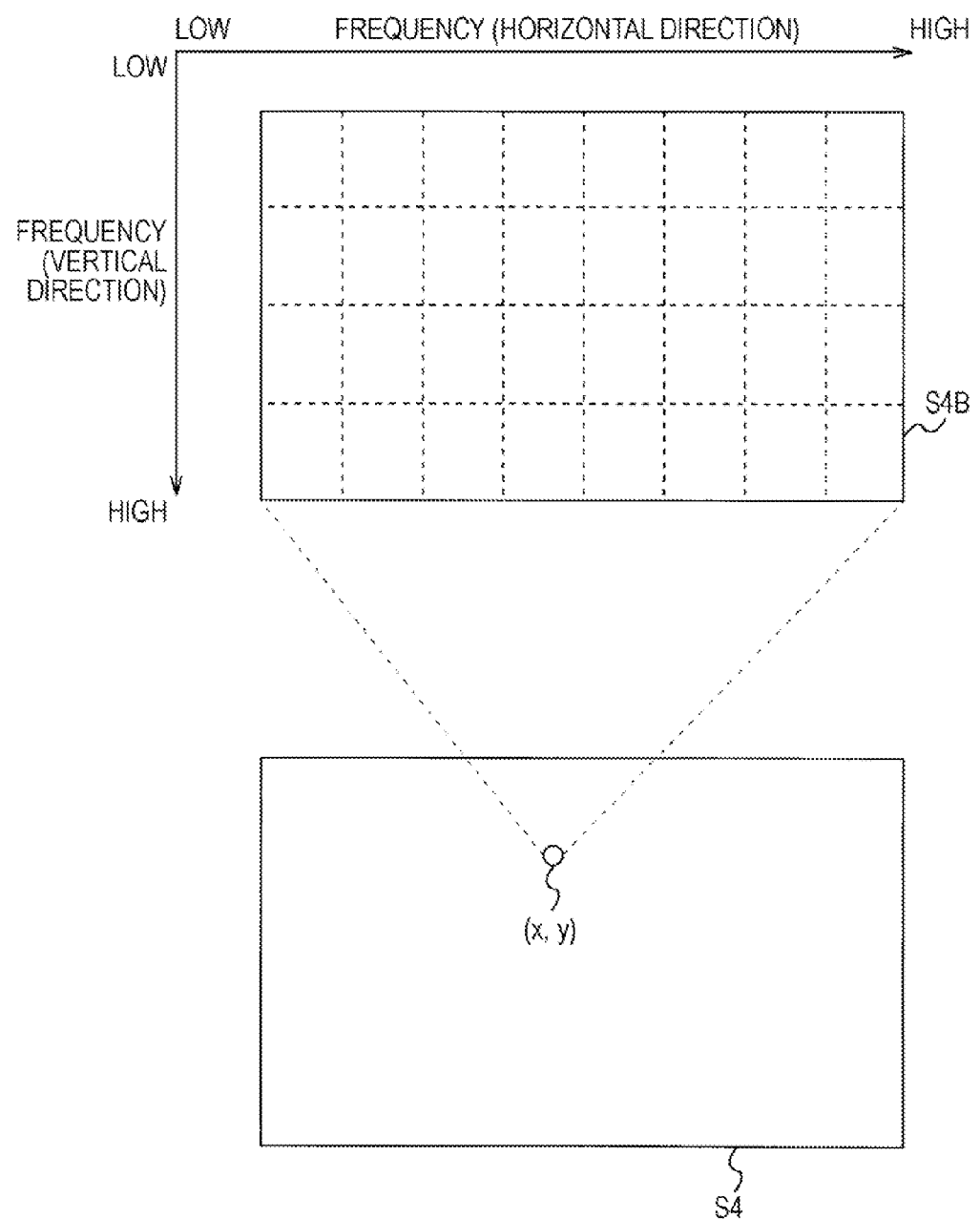
FIG. 10 is a plan view illustrating a cycle determination section in the noise filter of FIG. 9.

A cycle determination section 51 is the same as the cycle determination section 27 described above in the first embodiment, and determines the amplitude value of the sub-difference signal S4B for each band, and outputs a cycle identification flag F1B. Accordingly, as shown in FIG. 10, if a difference signal S4B is divided into 8 bands and 4 bands in the horizontal direction and in the vertical direction, respectively, sub-difference signal S4B is divided into 32-line signals. Thus, a cycle determination section 51 multiplies the noise level NLB corresponding to each pixel by a constant α for each band to generate the criterion value Cth B (NL·α) of each band, determines the amplitude value |Diff (x, y) B| of the corresponding sub-difference signal S4B by the criterion value Cth B, and sets the cycle identification flag F1B. In this regard, here, the following expression is a relational expression related to the setting of this threshold value and the setting of the flag. Here, bx and by are variables for identifying each band in the horizontal direction and the vertical direction, respectively. $NL_{bx, by}$ is the noise level of the band identified by variables bx and by. $Cth_{bx, by}$ is the threshold value identified by the variables bx and by. $|Diff_{bx, by}(x, y)|$ is the amplitude value of the band identified by variables bx and by in the pixel having the coordinate (x, y) in the horizontal direction and the vertical direction. When the relational expression Expression (8) holds, the cycle determination section 51 sets the cycle identification flag F1B of the corresponding band. In this regard, the threshold value can be set in various methods in the same manner as described above in the first embodiment.

[Expression 7]

$$Cth_{bx,by} = NL_{bx,by} \cdot \alpha \qquad (7)$$

[Expression 8]

$$|Diff_{bx,by}(x,y)| < Cth_{bx,by} \qquad (8)$$

Figure 11:
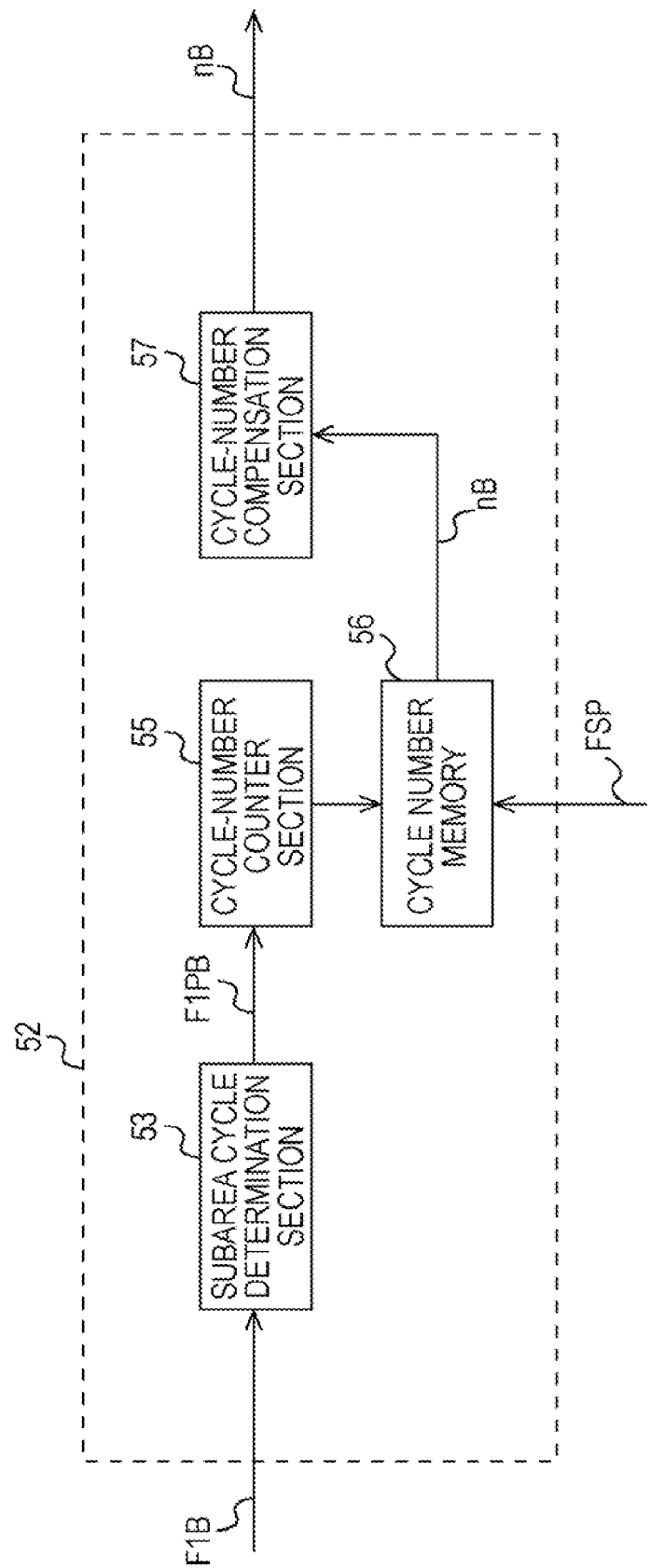
FIG. 11 is a block diagram illustrating the configuration of the cyclic-history information storage section in the noise filter of FIG. 9.
Figure 12:
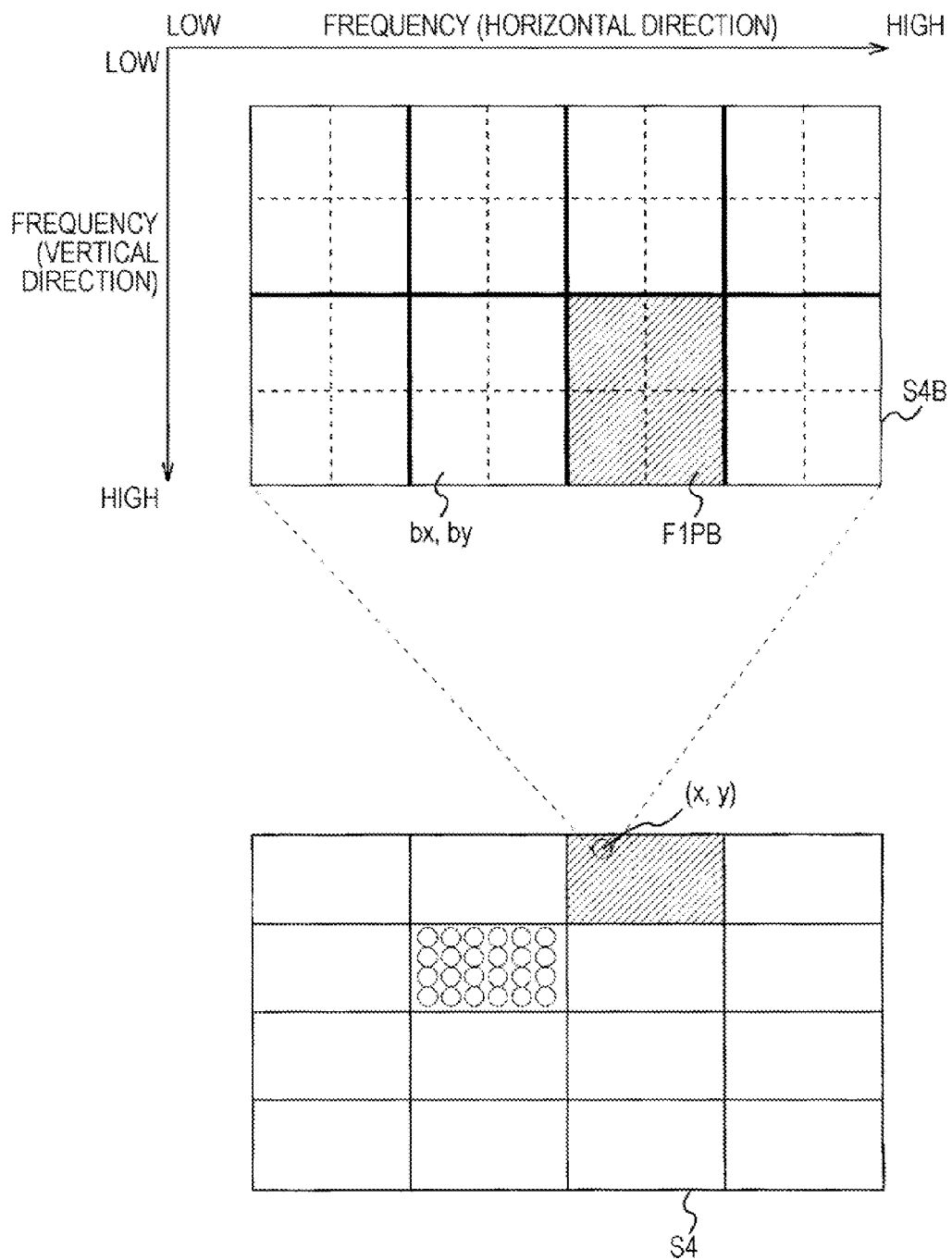
FIG. 12 is a plan view illustrating the cyclic-history information storage section of FIG. 10.
Figure 13:
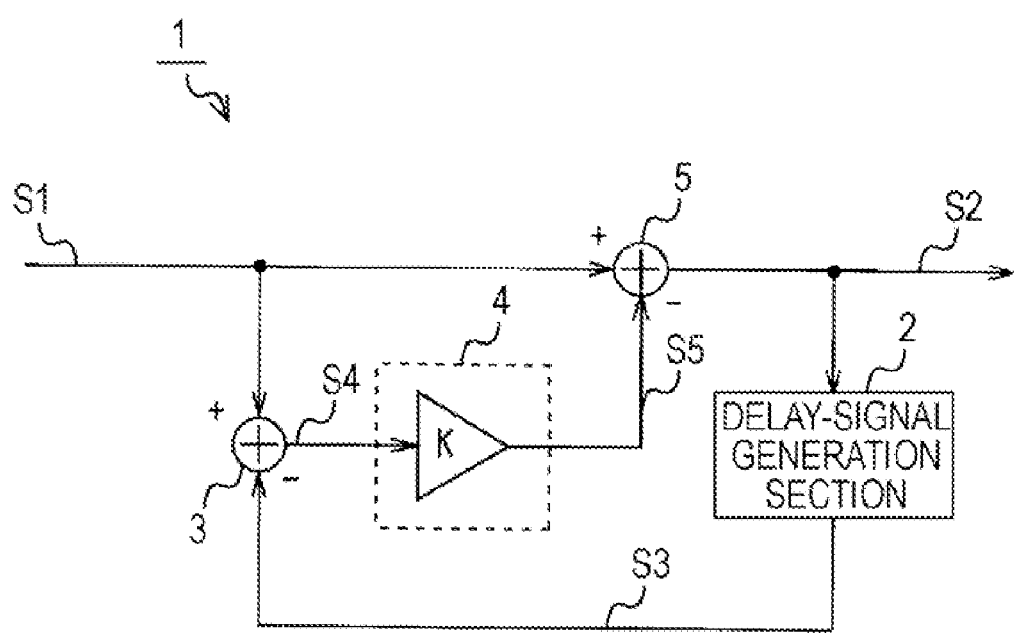
FIG. 13 is a block diagram illustrating a known time-cyclic noise filter.
Figure 14:
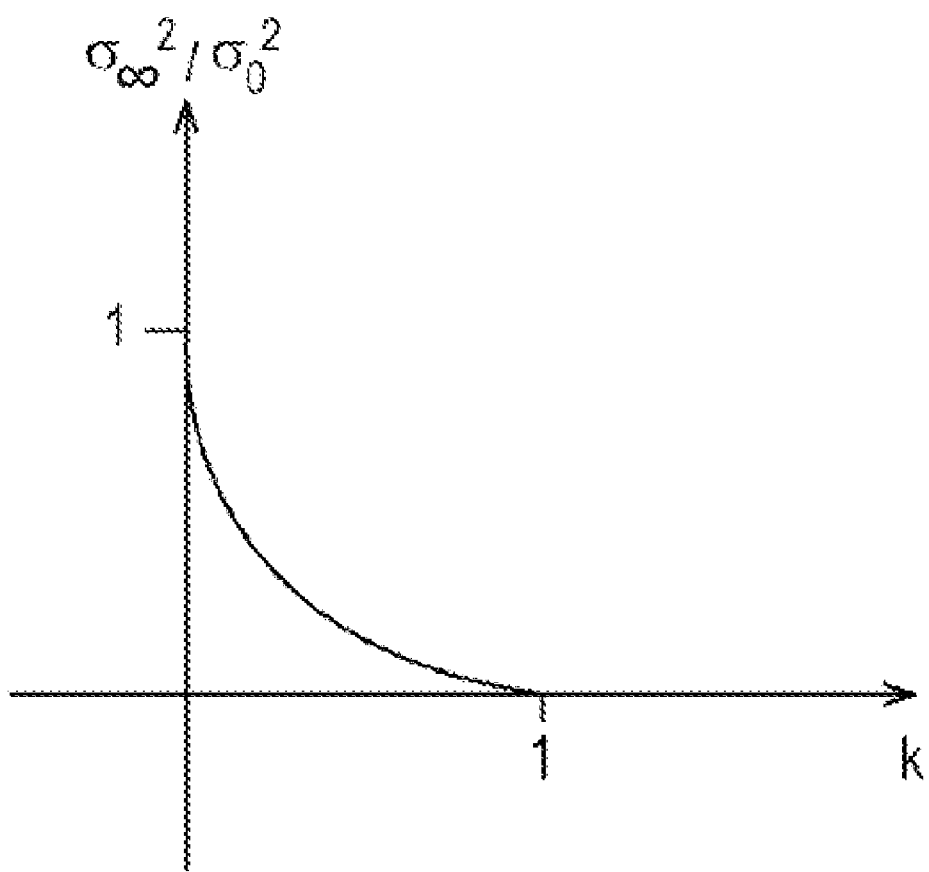
FIG. 14 is a characteristic curve illustrating a feedback ratio.
Figure 15:
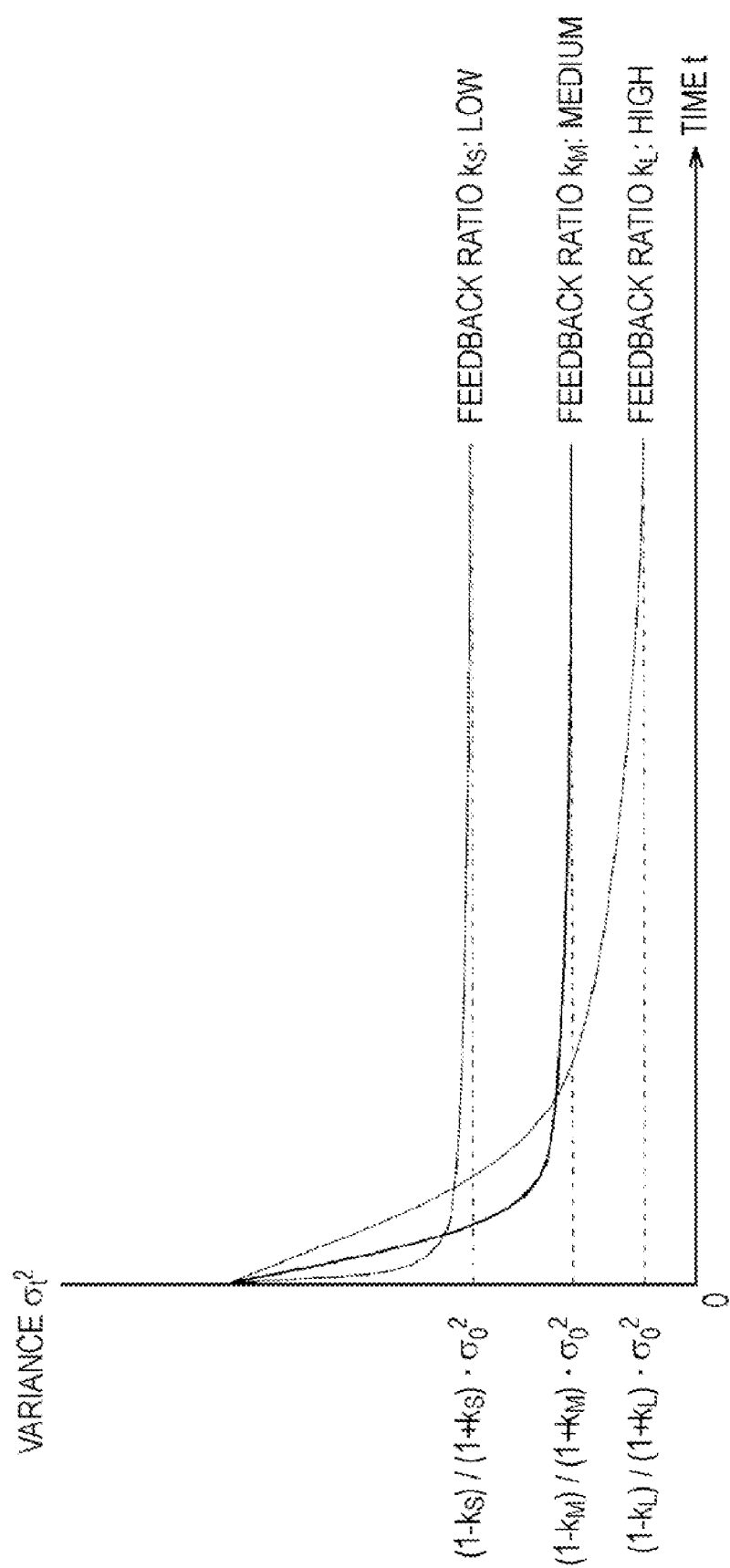
FIG. 15 is a characteristic curve illustrating a change in a characteristic by a feedback ratio.

In the same manner as the cyclic-history information storage section 28 described above in the first embodiment, a cyclic-history information storage section 52 obtains the number of repetitive setting times nB of the feedback ratio kcB for each band, and outputs the number. Here, FIG. 11 is a block diagram illustrating the cyclic-history information storage section 52. In the same manner as the subarea cycle determination section 29 described above in the first embodiment, in the cyclic-history information storage section 52, a subarea cycle determination section 53 determines the number of the cycle identification flag F1B for each area, and sets a area cycle identification flag F1PB. At this time, the subarea cycle determination section 53 sets the area cycle identification flag F1PB for each band. Also, as shown in FIG. 12, the subarea cycle determination section 53 further sets the area cycle identification flag F1PB together in a plurality of bands having adjacent frequencies in the horizontal direction and in the vertical direction in order to simplify the subsequent processing. In this regard, in the example shown in FIG. 12, 2×2 bands adjacent each other in the horizontal direction and in the vertical direction are grouped into one, and the area cycle identification flag F1PB is set for each grouped bands. In this example, 8 area cycle identification flags F1PB are set for one area. In this regard, the area cycle identification flag F1PB may be set for each original band without grouping a plurality of bands into one in this manner.

A cycle-number counter section 55, a cycle number memory 56, and a cycle-number compensation section 57 are the same as the cycle-number counter section 31, the cycle number memory 30, and the cycle-number compensation section 32 described in the first embodiment, respectively, and calculate the number of setting times nB for each band, and output the number.

A feedback-ratio setting section 59 is the same as the feedback-ratio setting section 35 described in the first embodiment, and calculates the feedback ratio kt for each band, and outputs the feedback ratio kt.

With this embodiment, by setting the feedback ratio for each band, it is possible to reduce noise more reliably than the first embodiment.

Third Embodiment

In this regard, in the above described embodiments, a description has been given of the case of obtaining the final feedback ratio kt by multiplying the feedback ratio kh set for each area and feedback ratio kc set for each pixel. However, the present invention is not limited to this. When a sufficient characteristic can be practically ensured, the noise compensation signal may be generated only by the feedback ratio kh set for each area.

Also, in the above-described embodiments, a description has been given of the case of constituting the noise filter by hardware. However, the present invention is not limited to this, and may be constituted by the execution of a program by the calculation processing means. In this regard, in this case, this program may be provided by pre-installation, or may be provided by being recorded on a recording medium, such as an optical disc, a magnetic disk, a memory card, etc. Furthermore, the program may be provided by being loaded down through a network, such as the Internet, etc.

It should be understood by those skilled in the art that various modifications, combinations, sub-combinations and alterations may occur depending on design requirements and other factors insofar as they are within the scope of the appended claims or the equivalents thereof.

What is claimed is:

1. A method of suppressing noise of an input video signal and outputting an output video signal, the method comprising:
   generating a difference signal being a field difference or a frame difference between the input video signal and the output video signal;
   generating a noise compensation signal by multiplying the difference signal by a feedback ratio;
   subtracting the noise compensation signal from the input video signal; and
   controlling a feedback ratio, wherein the controlling of a feedback ratio includes:
      determining a signal level of the difference signal by a criterion value for each area set for the difference signal,
      detecting an abrupt change in a signal level of the input video signal,
      counting the number of fields or the number of frames of the input video signal from the time when a first abrupt change in the signal level is detected to the time when a second abrupt change in the signal level is subsequently detected, and
      setting a feedback ratio for each of the areas in accordance with a count value resulting from the counting, wherein the feedback ratio is set such that the feedback ratio gradually increases from 0 as the count value increases.

2. The method according to claim 1, further comprising:
   measuring a noise level of the input video signal to output a noise-level measuring result; and
   setting the criterion value on the basis of the noise-level measuring result.

3. The method according to claim 1, further comprising
   detecting a scene change in the input video signal, wherein the count values of all the areas are initialized to 0 based on a detection of a scene change.

4. The method according to claim 1, further comprising
   measuring a noise level of the input video signal to output a noise-level measuring result, wherein the feedback ratio is compensated such that the feedback ratio value decreases as an amplitude value of the difference signal with respect to the noise-level measuring result increases.

5. The method according to claim 1, wherein
   the step of generating a difference signal comprises dividing the difference signal into a plurality of bands and outputting the signal,
   the step of generating a noise compensation signal comprises multiplying the difference signal by a feedback ratio of the corresponding band for each of the plurality of bands, and synthesizing the bands to generate the noise compensation signal, and
   the step of controlling a feedback ratio controls comprises controlling the feedback ratio for each band.

6. A non-transitory recording medium for recording a program of a method of suppressing noise of an input video signal and outputting an output video signal, the program comprising the steps of:
   generating a difference signal being a field difference or a frame difference between the input video signal and the output video signal;
   generating a noise compensation signal by multiplying the difference signal by a feedback ratio;
   subtracting the noise compensation signal from the input video signal; and
   controlling a feedback ratio, wherein the controlling of a feedback ratio includes:
      determining a signal level of the difference signal by a criterion value for each area set for the difference signal,
      detecting an abrupt change in a signal level of the input video signal,
      counting the number of fields or the number of frames of the input video signal from the time when a first abrupt change in the signal level is detected to the time when a second abrupt change in the signal level is subsequently detected, and
      setting a feedback ratio for each of the areas in accordance with a count value resulting from the counting, wherein the feedback ratio is set such that the feedback ratio gradually increases from 0 as the count value increases.

7. A noise suppressing apparatus for suppressing noise of an input video signal and outputting an output video signal, the noise suppressing apparatus comprising:
a difference-signal generation section generating a difference signal being a field difference or a frame difference between the input video signal and the output video signal;
a noise compensation-signal generation section generating a noise compensation signal by multiplying the difference signal by a feedback ratio;
a noise-compensation signal subtraction section subtracting the noise compensation signal from the input video signal; and
a feedback-ratio control section controlling the feedback ratio,
wherein the feedback ratio control section includes:
a signal-level determination section determining a signal level of the difference signal by a criterion value for each area set for the difference signal, and detecting an abrupt change in a signal level of the input video signal,
a count section counting the number of fields or the number of frames of the input video signal from the time when the signal-level determination section detects a first abrupt change in the signal level to the time when the signal-level determination section subsequently detects a second abrupt change in the signal level, and
a feedback-ratio setting section setting the feedback ratio for each of the areas in accordance with a count value of the count section, wherein the feedback-ratio setting section sets the feedback ratio such that the feedback ratio gradually increases from 0 as the count value increases.

* * * * *